US006912057B1

(12) United States Patent
Idehara

(10) Patent No.: US 6,912,057 B1
(45) Date of Patent: Jun. 28, 2005

(54) IMAGE FORMING APPARATUS AND IMAGE FORMING METHOD

(75) Inventor: Takenori Idehara, Machida (JP)

(73) Assignee: Minolta Co., Ltd., Osaka (JP)

(*) Notice: Subject to any disclaimer, the term of this patent is extended or adjusted under 35 U.S.C. 154(b) by 0 days.

(21) Appl. No.: 09/524,005

(22) Filed: Mar. 13, 2000

(30) Foreign Application Priority Data

Mar. 15, 1999 (JP) ............................................ 11-068376

(51) Int. Cl.⁷ ................................................ G06F 5/00
(52) U.S. Cl. ...................... 358/1.1; 358/1.13; 358/1.15; 358/1.18
(58) Field of Search .................... 358/1.1, 1.13, 358/1.15, 1.18, 400, 408; 347/14, 19; 704/4, 5; 382/397

(56) References Cited

U.S. PATENT DOCUMENTS

| 5,655,208 | A | * | 8/1997 | Sahay et al. ................. 399/397 |
| 5,956,669 | A | * | 9/1999 | Ozawa ........................... 704/5 |
| 6,003,967 | A | * | 12/1999 | Mazaki .......................... 347/19 |
| 6,256,107 | B1 | * | 7/2001 | Toda ........................... 358/1.15 |
| 6,606,165 | B1 | * | 8/2003 | Barry et al. .................. 358/1.9 |

FOREIGN PATENT DOCUMENTS

| JP | 6-51923 | | 2/1994 | |
| JP | 8-274974 | * | 10/1996 | ............ H04N/1/46 |

* cited by examiner

Primary Examiner—Twyler Lamb
(74) Attorney, Agent, or Firm—Morrison & Foerster LLP

(57) ABSTRACT

An apparatus including a receiving unit for receiving image data having color pages containing color images and monochromatic pages not containing any color images, a change unit for changing order of printing of the received image data in order to make color page printing to continue, a printing unit for printing on papers in the changed order, and a discharge unit for discharging printed papers into a plurality of bins based on page numbers received.

14 Claims, 7 Drawing Sheets

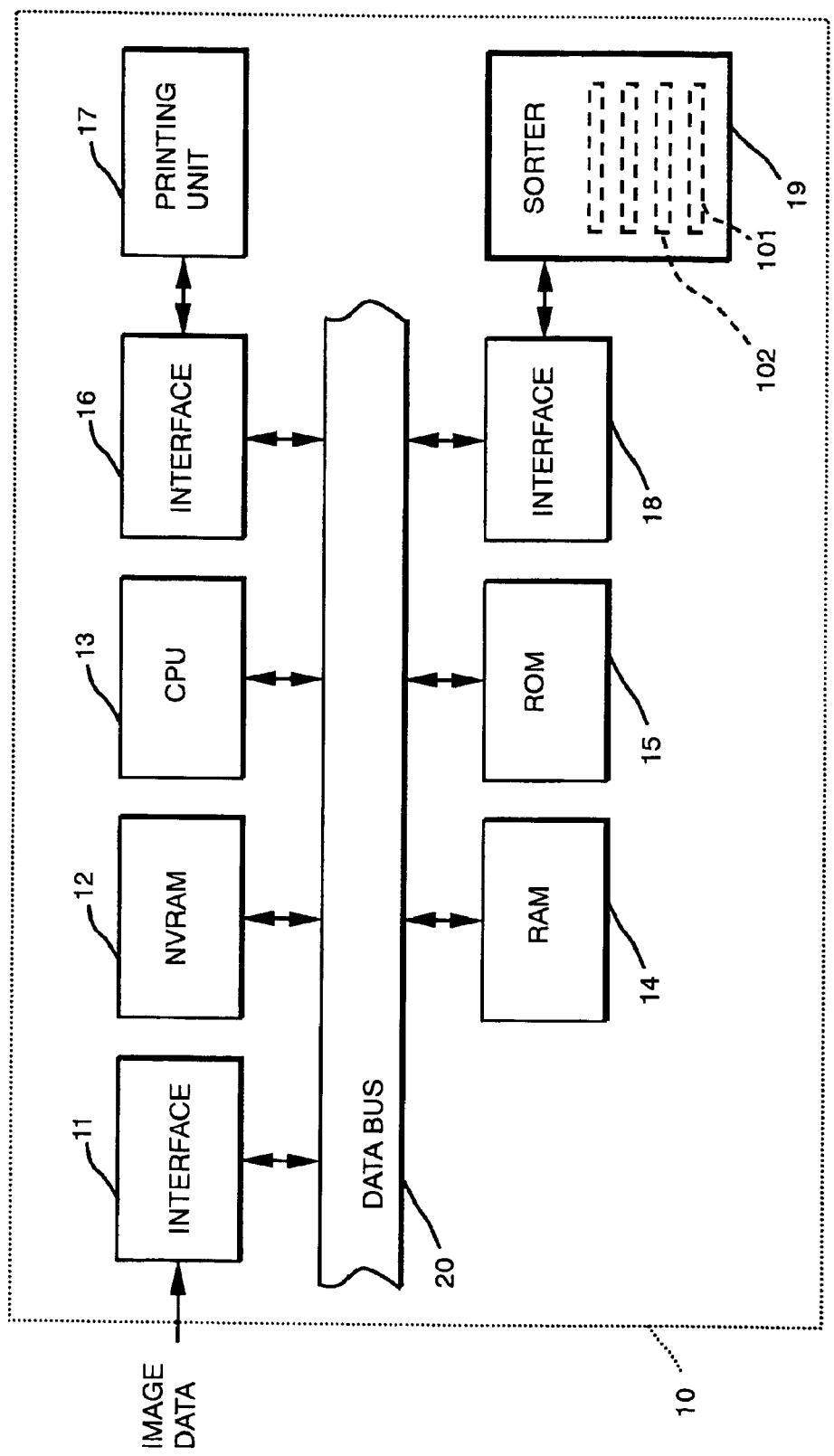

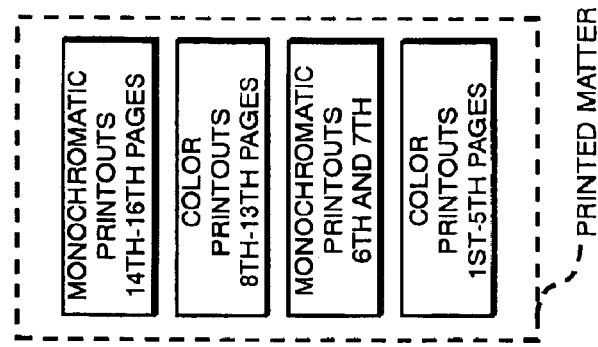
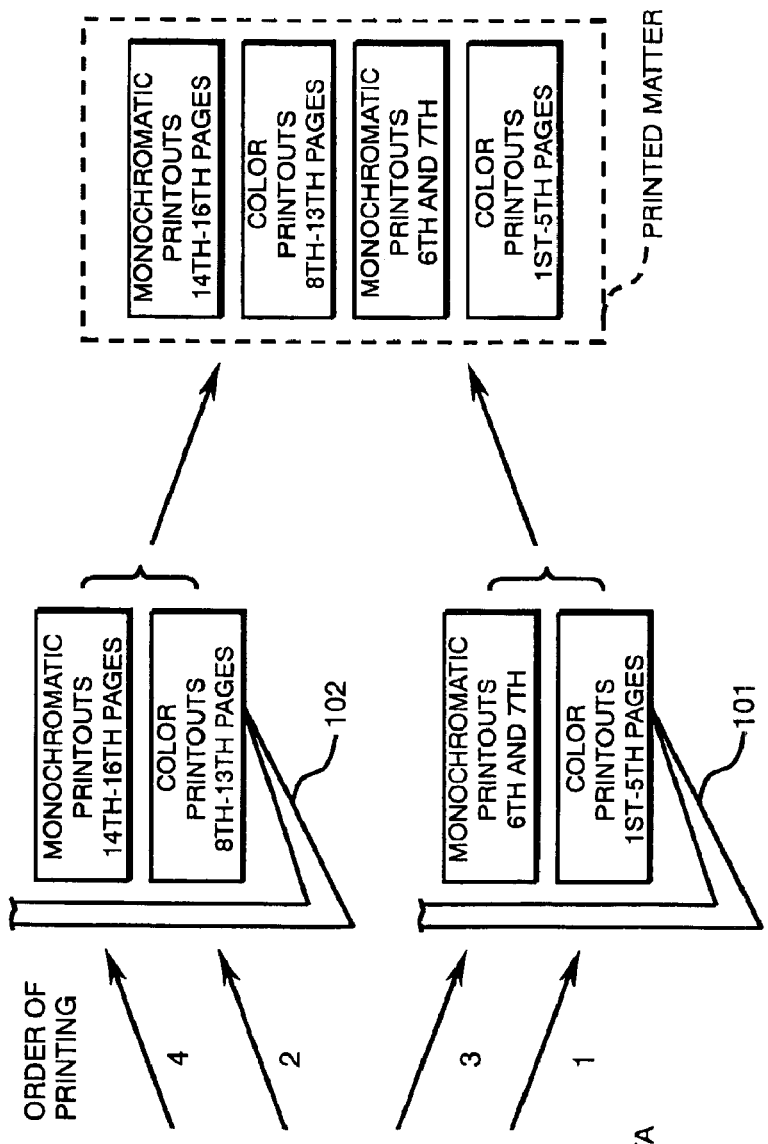
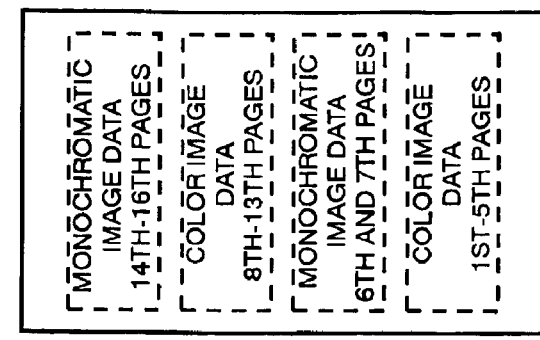

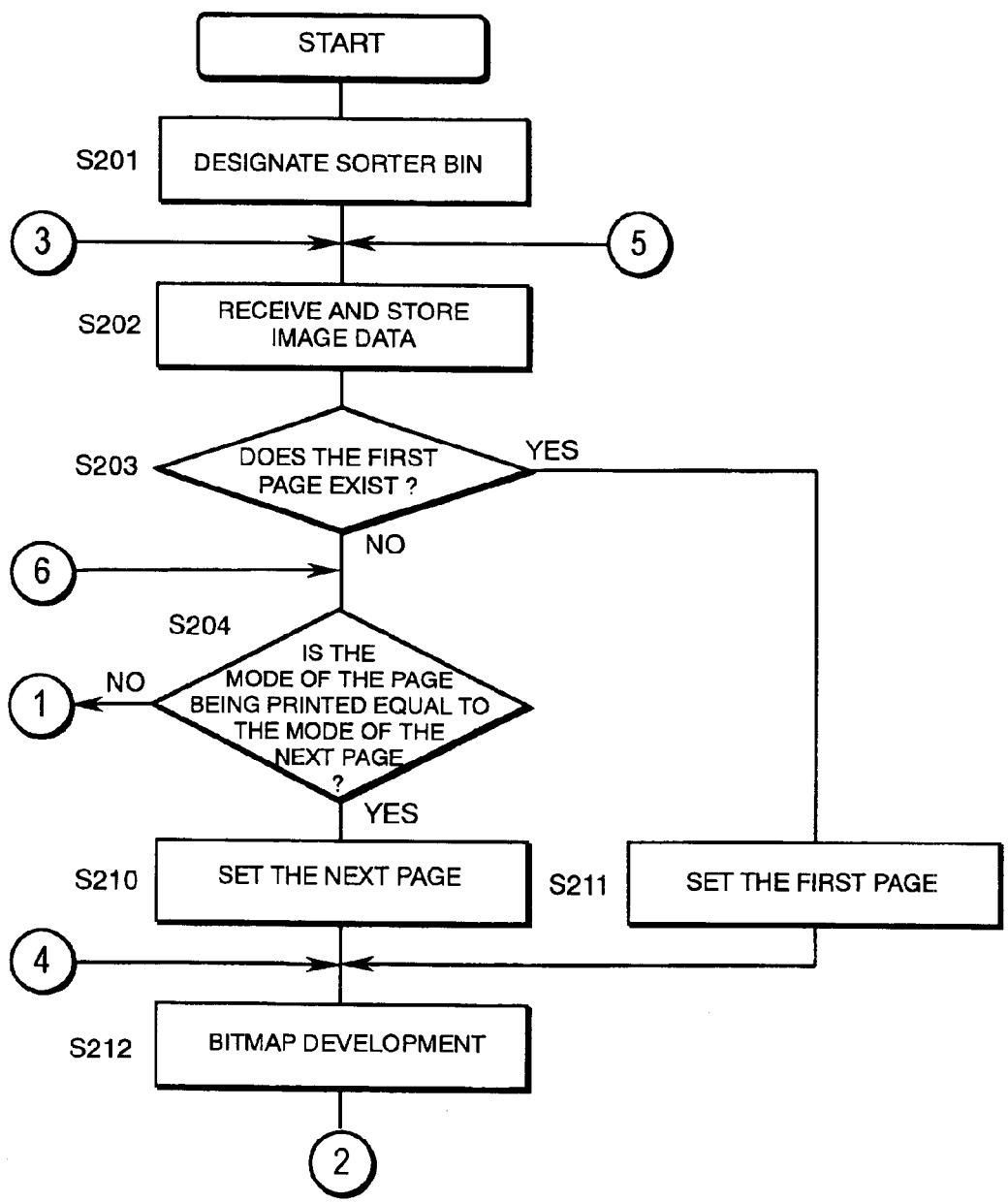

IMAGE FORMING APPARATUS AND IMAGE FORMING METHOD

This application is based on Japanese Patent Application No. 11-068376 filed on Mar. 15, 1999, the contents of which are hereby incorporated by reference.

BACKGROUND OF THE INVENTION

1. Field of the Invention

The present invention is related to an image forming apparatus and an image forming method capable of forming color and monochromatic images.

2. Description of Related Art

An image forming apparatus based on electronic photography such as a copying machine or a printer forms a color image by transferring and overlaying images developed using four colors of toners, i.e., yellow (Y), cyan (C), magenta (M) and black (K), sequentially on a paper. This forming process of color images is called the four cycle process as it requires the developing and copying processes four times each in order to overlay the four color images. On the other hand, the forming of a monochromatic image is called the one cycle process as it requires developing and transferring processes only once.

In certain cases, data used for image forming may contain both color images and monochromatic images. This corresponds to a case where the original document consists of both color pages containing color images and monochromatic pages composed of monochromatic images. Furthermore, with reference to the printer, it corresponds to a case where the output data consists of monochromatic pages consisting of monochromatic images such as text data, and color pages including color images such as color photographs or color graphics.

In case of conventional copying machines and printers, image forming for monochromatic pages and color pages are treated by the one cycle process and the four cycle process respectively. Therefore, if the job data has both monochromatic pages and color pages, the one cycle process and the four cycle process have to be switched from one to another in the middle of the printing.

However, process switching requires changes of the process speeds such as the rotating speeds of the photoconductor drum and the transfer drum, the fixing speed, the paper transport speed, or the like, so that it causes waiting time. Process switching occurs more frequently particularly when color pages and monochromatic pages are sequenced randomly. As a consequence, the waiting times are accumulated and the printing time gets longer.

Publication of Unexamined Japanese Patent Application, JP-A-8-274974 discloses a method of solving this kind of problem using a first printer for color pages and a second printer for monochromatic pages. The method includes the steps of dividing the job data into color images and monochromatic images, printing color images and monochromatic pages by the first and second printers respectively, inserting monochromatic pages outputted from the second printer into an external paper feed unit of the first printer, and discharging color pages and monochromatic pages in a proper order from the first printer.

However, the method is naturally not applicable to a case where there is only one printer as it requires two printers. Moreover, the method is not applicable to a case in which a copying machine is to print a document containing both color pages and monochromatic pages.

SUMMARY OF THE INVENTION

It is an object of the present invention to provide an apparatus including a receiving unit for receiving image data consisting of color pages containing color images and monochromatic pages not containing any color images, a change unit for changing order of printing of the received image data in order to make color page printing to continue, a printing unit for printing on papers in the changed order; and a discharge unit for discharging printed papers into a plurality of bins based on page numbers received.

A further object of the invention is to provide a method of forming images including the steps of receiving image data consisting of color pages containing color images and monochromatic pages not containing any color images, changing order of printing of the received image data in order to make color page printing to continue, printing on papers in the changed order, and discharging printed papers into a plurality of bins based on page numbers received.

Still a further object of the invention is to provide an apparatus including a receiving unit for receiving image data consisting of color pages containing color images and monochromatic pages not containing any color images, a sorting unit for sorting the image data into a color page group and a monochromatic page group, a printing unit for printing continuously on papers by group, and a discharge unit for discharging printed papers into a plurality of bins based on page numbers received.

The objects, characteristics, and advantages of this invention other than those set forth above will become apparent from the following detailed description of the preferred embodiments, which refers to the annexed drawings.

BRIEF DESCRIPTION OF THE DRAWINGS

FIG. 1 is a block diagram of a printer according to an embodiment 1;

FIG. 3A through FIG. 3C show schematic diagrams of assistance in explaining a specific example of the printing procedure; and FIG. 4A through FIG. 4C show flow charts of the printing procedure of a printer according to an embodiment 2.

DETAILED DESCRIPTION OF THE EMBODIMENTS

Figure 2A:
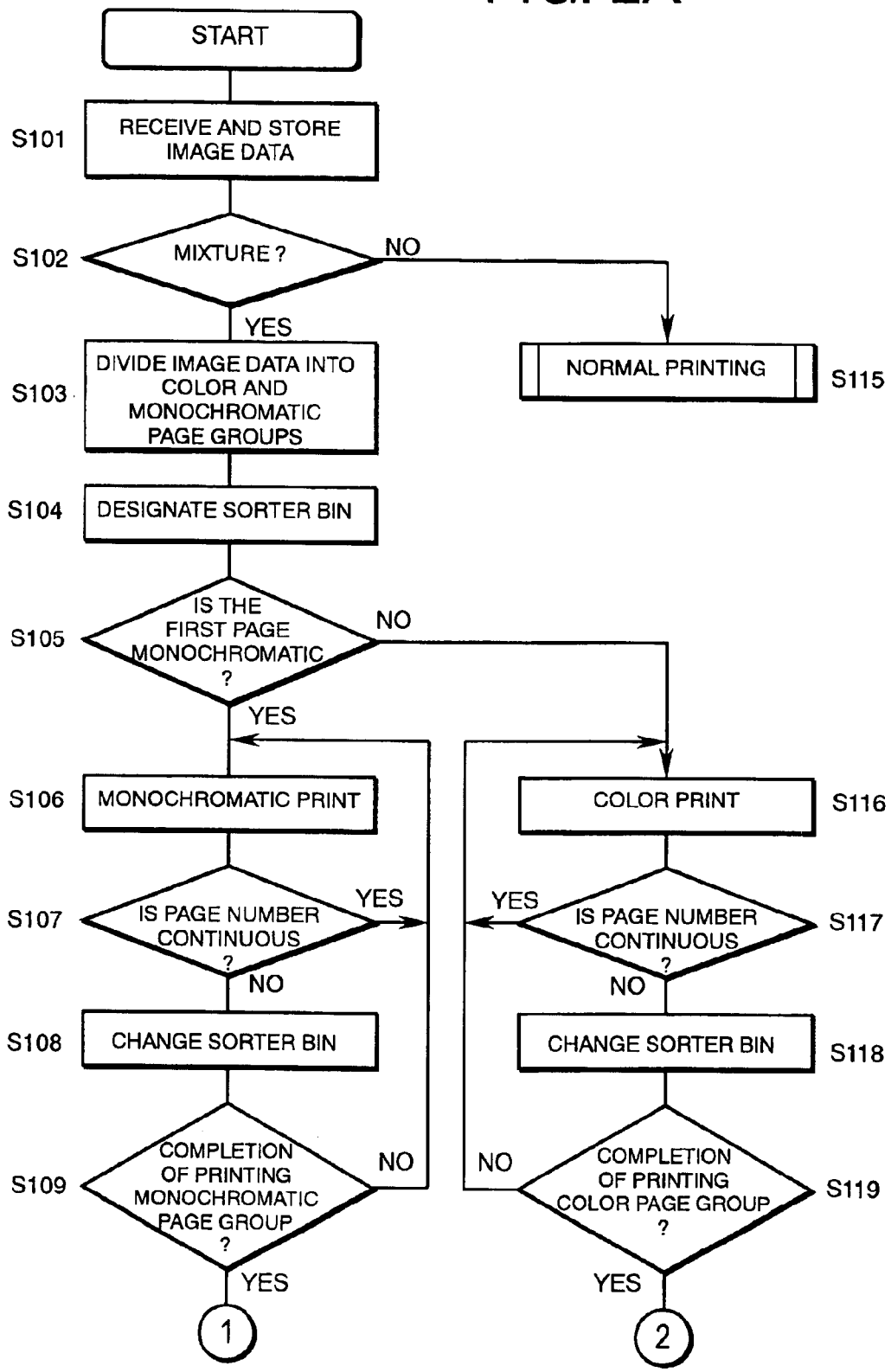
FIG. 2A and FIG. 2B show flow charts of the printing procedure of the printer.

The embodiments of this invention will be described below with reference to the accompanying drawings.

Embodiment 1

The image forming apparatus 10 shown in FIG. 1 is a color printer based on electronic photography in which color pages and monochromatic pages are printed according to the four cycle process and the one cycle process respectively. More specifically, color images are formed by transferring and overlaying the images developed using four colors of toners, i.e., yellow (Y), cyan (C), magenta (M) and black (K), sequentially on papers. On the other hand, monochromatic images are formed by transferring the images developed using, for example, a black (K) toner to papers.

Printer 10 includes, as shown in the figure, interfaces 11, 16, and 18, a NVRAM 12, a RAM 14, a ROM 15, a CPU 13, a printing unit 17, a sorter 19 and a data bus 20.

Interface 11 is used for inputting the image data from external equipment such as a computer or a scanner into the printer 10. NVRAM 12 stores data of various kinds such as initial conditions, various parameters. While RAM 14 is used for storing original image data entered via interface 11 and also used as a work area for developing image data into bitmap data. ROM 15 stores specific programs. CPU 13 executes necessary processes, e.g., rasterization of image data, by means of executing programs stored in ROM 15. Interface 16 is used for outputting the bitmap data developed through rasterization of image data into printing unit 17. Printing unit 17 forms images based on electronic photography using the bit map data. Sorter 19 is equipped with a plurality of bins for storing printed papers, or printouts being discharged from printing unit 17. The bins are arranged in a vertical direction, and the bottom bin and the next to the bottom bin are identified as a first bin 101 and a second bin 102 respectively. Interface 18 is used for CPU 13 to control sorter 19. Data bus 20 is a path for transmitting image data and various control signals to various parts of the system. Printer 10 may be equipped with a storage device of a large capacity such as a hard disk drive for storing image data.

Figure 2B:
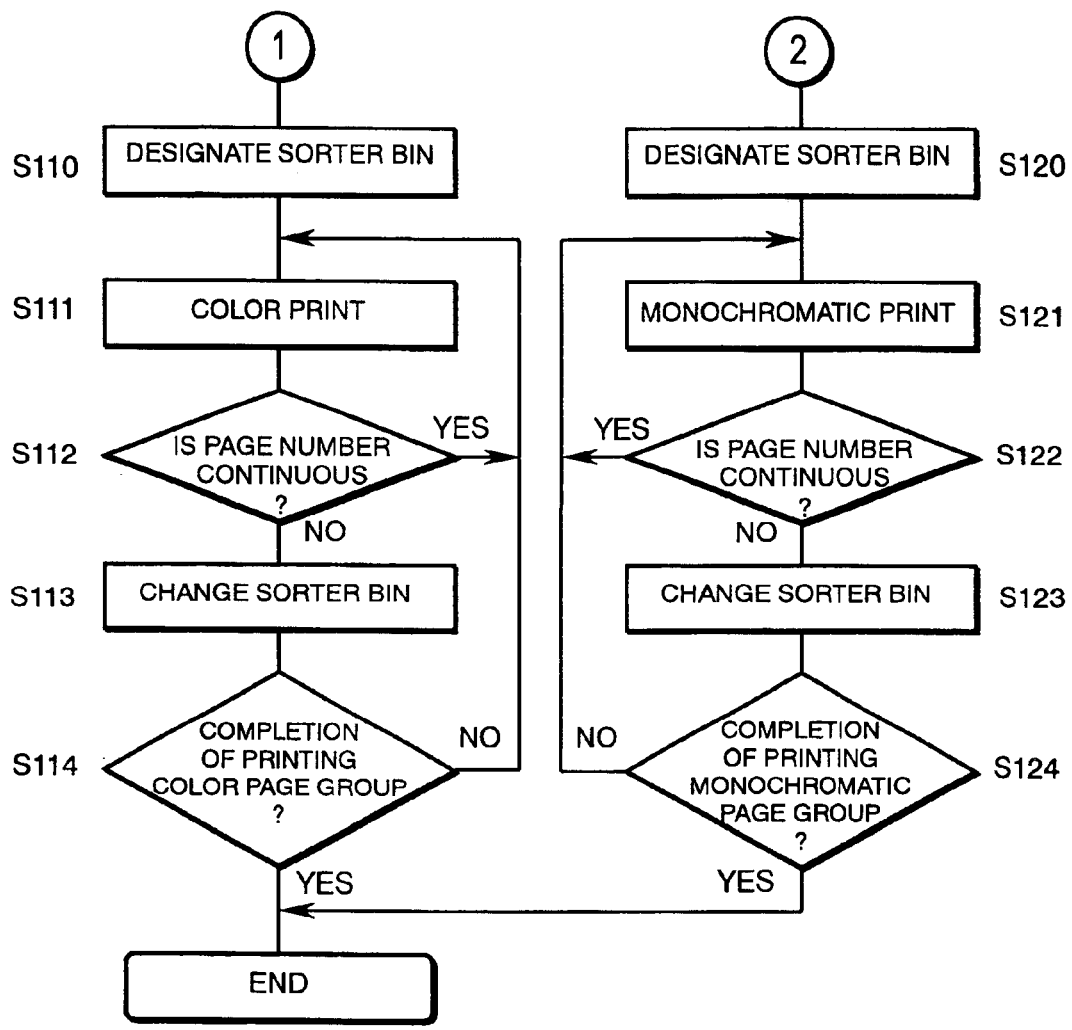

The procedure for printing the job data or the image data transmitted from external equipment will be described referring to FIG. 2A and FIG. 2B.

The image data is transmitted through interface 11 to be stored in RAM 14 (step S101). At the same time, the page number of each page in the image data is judged based on the data contained in the image data that represents the particular page number. The data that represents the page number is, for example, the page number data included in the image data of each page, or an index data included in the image data. The index data is prepared separately from the image data for each page and indicates the relation between each page and page number. On the other hand, if the image data includes no data to represent the page number, the page number can be judged based on, for example, counting the number of page breaks, or the page data receiving sequence.

Next, it is judged whether color pages and monochromatic pages exist in the image data (step S102). The discrimination between color pages and monochromatic pages can be executed by referencing index data that shows whether the particular page is a color page or a monochromatic page, if such an index data is attached to the image data. It is also possible to determine whether a page is a color page or a monochromatic page based on the intensities of the particular page relative to four colors, i.e., yellow (Y), cyan (C), magenta (M) and black (K). For example, the page in question is judged to be a color page if the intensity of each color for the particular page exceeds a certain limit, while it is judged to be a monochromatic page if the intensity is below the limit. It is also possible to determine that the page in question is monochromatic if its data consists only of one color, e.g., black (K).

If it is judged that there is no mixture of color pages and monochromatic pages in the image data at step S102, normal printing is executed (step S115). Specifically, the four cycle process is applied if the image data consists only of color pages, while the one cycle process is applied if the image data consists of monochromatic pages.

If it is judged that there is a mixture of color pages and monochromatic pages in the image data at step S102, the image data is divided into a color page group and a monochromatic page group to be sorted in an ascending order of page numbers (step S103). Next, sorter 19 is activated to designate the first bin 101 at the lowest position as a bin for storing printouts (step S104). Next, it is judged whether the first page of the image data received is monochromatic (step S105).

The procedure taken when the first page is judged to be monochromatic at step S105 is as follows.

First, the first page included in the monochromatic page group is printed in a monochromatic color by means of the one cycle process and is discharged into the first bin 101, which is the bin currently designated (step S106). Next, it is judged whether the page number of the next page in line of the monochromatic group is continuous (step S107). The decision of continuity is made by detecting a boundary where the page number becomes discontinuous. When it is judged that the page number is continuous at step S107, the process returns step S106 and continues the printing of monochromatic page group.

If, at step S107, the page number is judged to be discontinuous, i.e., a boundary where the page number becomes discontinuous is detected, the sorter is activated and the bin for receiving printouts will be changed to the second bin 102 located immediately above the first bin 101 (step S108). Next, it is judged whether the printing of the monochromatic group has been completed (step S109). If the printing is judged to be incomplete at step S109, the process returns to step S106 to continue the printing of the monochromatic page group. Each time when the page number is discontinuous at step S107, the sorter is activated and the bin for storing printouts will be changed to another bin located immediately above the bin that is designated at the moment.

The sorter will be activated if the printing of the monochromatic page group has been completed at step S109, and the bin for storing printouts will be changed to the first bin 101 that was designated in the beginning (step S110).

Next, the first page contained in the color page group is color-printed by means of the four cycle process to be discharged to the first bin 101 (step S111). Next, the page number of the next page contained in the color page group is judged whether it is continuous (step S112). When it is judged that the page number is continuous at step S112, the process returns to step S111 and continues the printing of the color page group.

When it is judged that the page number is discontinuous at step S112, the sorter will be activated and the bin for storing printouts will be changed to the second bin 102 located immediately above the first bin 101 (step S113). Next, it is judged whether the printing of the color group has been completed (step S114). If the printing is judged to be incomplete at step S114, the process returns to step S111 to continue the printing of the color page group. Each time when the page number is discontinuous at step S112, the sorter is activated and the bin for storing printouts will be changed to another bin located immediately above the bin that is designated at the moment. When it is judged that the printing of the color page group has been completed at step S114, the process is terminated.

The process taken when the first page is a color page at step S105 is as follows.

First, the first page included in the color group will be color-printed by the four cycle process and discharged into the first bin 101, which is currently designated (step S116). Next, it is judged whether the page number of the next page is continuous (step S117). If it is judged that the page number is continuous at step S117, the process returns to step S116 to continue printing the color page group.

If the page number is judged to be discontinuous at step S117, the sorter will be activated to change the bin for storing printouts to the second bin 102 located directly above the first bin 101 (step S118). Next, it is judged whether the printing of the color page group is completed (step S119). If it is judged that the printing has not been completed at step S119, the process returns to step S116 to continue printing the color page group. Each time when the page number is discontinuous at step S117, the sorter will be activated to change the bin for storing printouts to another bin located directly above the bin currently designated.

If the printing of the color page group has been completed at step S119, the sorter will be activated to change the bin for storing printouts to the first bin 101, which was initially designated (step S120).

Next, the first page included in the monochromatic page group will be printed in a monochromatic color by the one cycle process and discharged into the first bin 101 (step S121). Next, the page number of the next page in the monochromatic page group is judged whether it is continuous (step S122). If the page number is judged to be continuous at step S122, the process returns to step S121 and continue printing the monochromatic page group.

If the page number is judged to be discontinuous at step S122, the sorter is activated and the bin for storing printouts will be changed to the second bin 102 located directly above the first bin 101 (step S123). Next, it is judged whether the printing of the monochromatic page group has been completed (step S124). If it is judged that the printing has not been completed at step S124, the process returns to step S121 to continue printing the monochromatic page group. Each time when the page number is judged to be discontinuous at step S122, the sorter will be activated to change the bin for storing printouts to another bin located directly above the bin currently designated. If the printing of the monochromatic page group has been completed at step S124, the process is terminated.

Next, the printing procedure will be described more specifically referring to FIG. 3A through FIG. 3C.

Print job data or image data shown in FIG. 3A consists of the first through fifth color pages, the sixth through seventh monochromatic pages, the eighth through the 13th color pages, and the 14th through 16th monochromatic pages. The image data is divided into the color page group and the monochromatic page group, where pages are sorted in an ascending order of page numbers within each group. Therefore, the color page group consists of 11 pages of data including those of the first through fifth pages and eighth through 13th pages, while the-monochromatic page group consists of five pages of data including those of the sixth, seventh and 14th through 16th pages.

First, the color page group is printed. More specifically, the first through fifth pages are printed from the color page group and discharged into the first bin 101 at the bottom. Next, the bin for storing printouts is changed to the second bin 102 located directly above the first bin 101. It is because the next page in the color page group is the eighth page and a page number discontinuity occurs. Next, the eighth through 13th pages included in the color page group are printed and discharged into the second bin 102. As the printing of the color page group terminates at this point, the bin for storing printouts is changed from the second bin 102 to the first bin 101, which was initially designated.

Next, the monochromatic page group is printed. More specifically, the sixth and seventh pages included in the monochromatic page group are printed and discharged into the first bin 101. The next page in the monochromatic page group is the 14th page and a page number discontinuity occurs, so that the bin for storing printouts is changed to the second bin 102 located above the first bin 101. Next, the 14th through 16th pages included in the monochromatic page group will be printed and discharged into the second bin 102.

As a result, the first bin 101 located at the bottom will be loaded with printouts consisting of the first through seventh pages, and the second bin 102 located above the first bin 101 will be loaded with the eighth through 16th pages as shown in FIG. 3B. Accordingly, a printed matter with continuous pages can be obtained by simply placing the printouts found in the first bin 102 on top of the printouts found in the first bin 101 as shown in FIG. 3C.

As described above, if the image data include color pages and monochromatic pages, the image data is divided into the color page group and the monochromatic page group to conduct printing by group. In other words, the switching of the process occurs only once, not frequently. Therefore, the overall printing speed increases. Especially, requiring change over only once substantially improve the overall printing time when the process change means the changes of process speeds, such as the rotating speeds of the photoconductor drum and the transfer drum, the fixing speed, and the paper transport speed to produce a substantial waiting time for the speed changes and adjustments.

Moreover, since the printouts are discharged to the bins based on their page numbers, a printed matter with continuous page numbers can be obtained easily.

On double chucking type printers or printers based on the double chucking method of simultaneously printing two sheets of paper in one transfer process, the printing efficiency drops if the number of prints is an odd number compared to a case where the number of prints is an even number. Moreover, since the number of prints is reset when the process is changed over, there is a possibility that the number of prints becomes an odd number every process changeover. Therefore, the printing efficiency drops substantially if the image data has a mixture of color pages and monochromatic pages, as it requires frequent process changeovers.

On the other hand, the method according to embodiment 1 requires the process changeover only once regardless of the degree of mixture of color pages and monochromatic pages. Therefore, double chucking type printers to which the method is applied can perform printing with a substantially improved speed compared to the conventional double chucking type printers when the image data has a mixture of color pages and monochromatic pages.

Embodiment 2

The printer according to embodiment 2 is different from the printer according to embodiment 1 in that it starts printing based on the data received at the moment without waiting for the completion of the transmission of the entire image data. In other words, embodiment 2 is related to expediting of the first print.

A storage device provided in the printer will be briefly explained below.

The storage device has two functions. The first function is to store the original data as received. For that purpose, either a semiconductor memory that stores the data by means of electric signal processing such as a RAM or an electromagnetic storage device such as a hard disk drive is used. A RAM can normally hold data equivalent to several pages, but in certain cases, as much as 100 pages of text in terms of A4 size. On the other hand, a hard disk drive is used for storing data equivalent to several hundreds of pages of text in terms of A4 size because of its large capacity. The second function is to provide a work area for developing the received data into bitmap data, in which case a dedicated RAM is used. The dedicated RAM can hold one or two pages of bitmap data. The bitmap data is an image data that is used for actual printing and is inputted to the printing unit.

Although the printing speed has been rapidly increasing in recent years, it is very much slower than the digital data processing speed, for example, the speed of receiving image data, the speed of writing image data into a storage device, and the speed of reading image data from the storage device. Therefore, receiving of image data and storing into the storage device that performs the first function are continued during printing in order to continue printing and reduce the waiting time in printing in embodiment 2.

Next, the process of printing the image data received from external equipment will be described referring to FIG. 4A through FIG. 4C.

First, as shown in FIG. 4A, the sorter is activated and the bottom bin is designated as the first bin for storing printouts (step S201). The image data received is then stored sequentially into RAM 14 (step S202). Incidentally, an image data of the first page or the page with a page number 1 as received is printed immediately without being retained as described later. Therefore, the storage of the image data of the first page may be skipped.

Next, it is judged whether the first page exists in the data that has not been printed among the image data received (step S203). When it is judged that the first page exists, the first page is set as the next page to be printed (step S211), and the process advances to a step S212. If it is judged that the first page does not exist, another judgment is made as to whether the mode of the page being printed is equal to the mode of the next page (step S204). There are two kinds of modes, representing that the page consists of monochromatic images and the page includes color images such as color photographs or color graphics respectively. The next page is defined as the page that has the page number obtained by adding one to the page number of the page being printed.

Figure 4B:
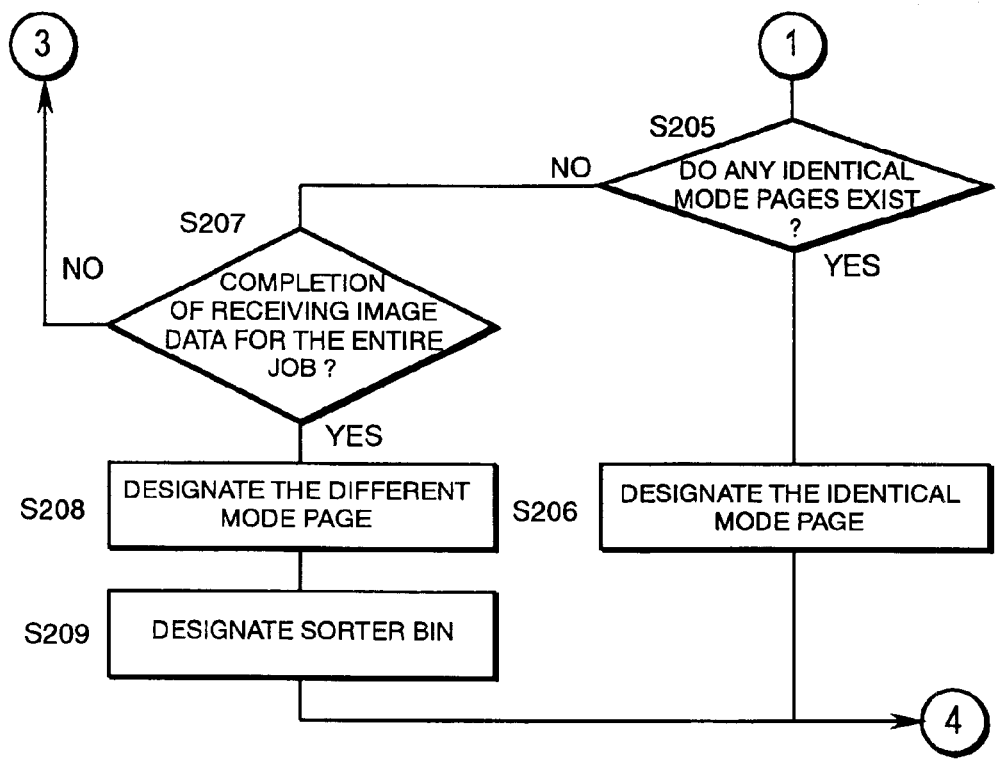
Figure 4C:
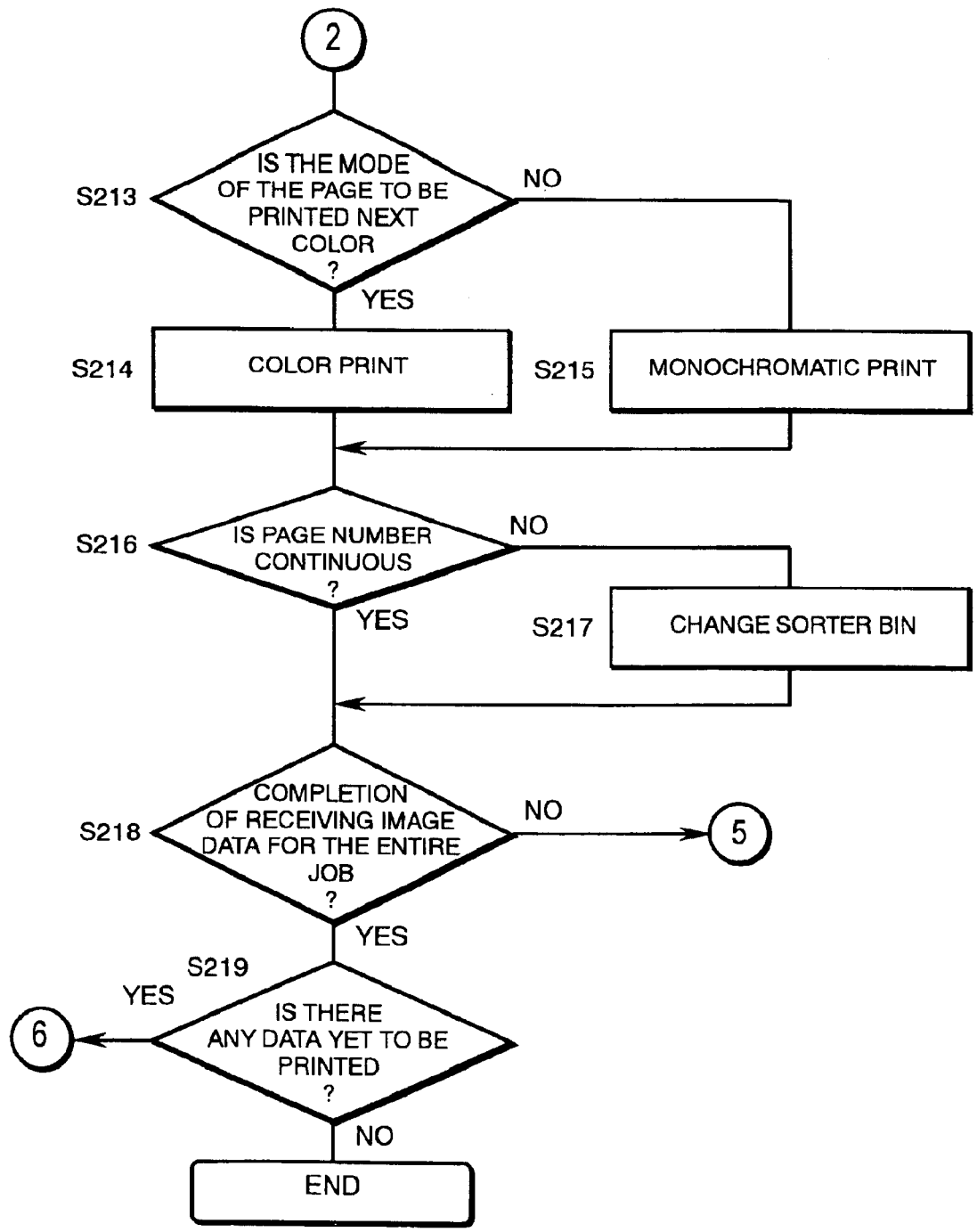

If it is judged that the two modes differ from each other at step S204, another judgment is made, as shown in FIG. 4B, as to whether any identical mode pages exist among the remaining data of the pages yet to be printed (step S205). The identical mode pages mean the pages with the same mode as the mode of the page being printed. The remaining data is the data of the pages with page numbers larger than the page number of the page being printed. If it is judged that no identical mode page exists among the remaining data, the process advances to step S207. If it is judged that identical mode pages exist among the remaining data, the identical mode page with the smallest page number is then designated as the page to be printed next (step S206), and the process advances to step S212 as shown in FIG. 4A.

It is judged whether the image data for the entire job has been received at step S207. If it is judged that the receiving of the image data for the entire job has not been completed, the process returns to step S202 shown in FIG. 4A and the receiving of the image data continues. If it is judged that the receiving of the image data for the entire job has been completed, a different mode page having the smallest page number is then designated as the page to be printed next (step S208). Next, the sorter is activated, the bin for storing printouts is changed to the bin that was initially designated to store the first page (step S209), and the process advances to step S212 shown in FIG. 4A. A different mode page here means a page that has a mode different from the mode of the page being printed.

If the mode of the next page is identical to the mode of the page being printed at step S204 shown in FIG. 4A, the next page is designated as the page to be printed next (step S210), and the process advances to step S212.

The image data of the page to be printed next is developed into bitmap data at step S212. The mode of the page to be printed next is judged, as shown in FIG. 4C, whether it is color or monochromatic (step S213). Color printing starts if the mode is judged to be color (step S214), while monochromatic printing starts if the mode is judged to be monochromatic (step S215). The image data that becomes unnecessary as printing is executed and the image data for the pages that have been printed will be erased from RAM 14 for the sake of effective use of the storage device. However, if the storage device is sufficiently large, unnecessary image data may be left without being erased.

Next, it is judged whether the page number of the page being printed is continuous with the page number of the page printed immediately before (step S216). With respect to the first page and the initial page of the different mode pages, it is however assumed that the page number is continuous. If the page number is continuous, the process advances to step S218 without switching the bin. If the page number is discontinuous, the sorter is activated, the bin that stores printouts is changed to another bin located immediately above the bin which is currently designated (step S217), and the process advances to step S218.

It is judged whether the receiving of the image data for the entire job is completed at step S218. If it is judged that the receiving of the entire image data has not been completed, the process returns to step S202 shown in FIG. 4A without waiting for the completion of the printing of the page being printed, and the receiving of the image data is continued. In other words, during the printing, the receiving and storing of the image data are continued. If the receiving of the image data for the entire job has been completed, it is judged whether there is any data yet to be printed (step S219). If it is judged that there are no more data to be printed, the process, or the printing is terminated. If it is judged that there are still some data to be printed, the process returns to step S204 shown in FIG. 4A.

As described above, printing starts based on the data that have been received up until then without waiting for the completion of the receiving of the entire image data. Therefore, the starting of the first print is expedited, and the prolongation of the printing time due to waiting for the data receiving is suppressed.

Moreover, a printed matter with continuous page numbers can be more easily obtained because printouts are discharge to a plurality of sorter bins based on their page numbers. In addition to that, the overall printing speed is improved due to the fact that the number of process changes is suppressed.

It is obvious that this invention is not limited to the particular embodiments shown and described above but may be variously changed and modified without departing from the technical concept of this invention.

The application of the present invention is not limited to printers; it can be suitably applied to copying machines as well. In the latter case, the image obtained by the scanning device built into the copying machine is used in place of the image data received from external equipment. The bins of the sorter do not have to be placed in a vertical direction; they can be arranged horizontally or in two or three dimensional arrays. As to the change of bins for storing printouts, the one to be changed to does not have to be adjacent with the bin to be changed from. Moreover, it is possible to sort the image data of the pages in a descending of the page number to start printing from the last page.

What is claimed is:

1. An apparatus comprising:

a receiving unit for receiving image data including color pages containing color images and monochromatic pages not containing any color images;

a change unit for changing order of printing of the received image data in order to make color page printing continuous;

a printer for printing on papers in the changed order, wherein after printing one of the color pages and the monochromatic pages, the other of the color pages and the monochromatic pages is continuously printed by the same printer; and a discharge unit for discharging printed papers into a plurality of bins based on page numbers received.

2. An apparatus according to claim 1, in which said discharge unit changes the bin used for receiving the printed papers if the page number is discontinuous during continuous printing of color pages.

3. An apparatus according to claim 1, in which said discharge unit changes the bin used for receiving the printed papers, if the page numbers are discontinuous during continuous printing of monochromatic pages.

4. An apparatus according to claim 1, in which the order of changing said bins for receiving the printed color pages corresponds to the order of changing said bins for receiving the printed monochromatic pages.

5. An apparatus according to claim 1, in which said printing unit starts to print a first page before the image data receiving is completed.

6. A method of forming images comprising the steps of:

receiving image data including color pages containing color images and monochromatic pages not containing any color images;

changing order of printing of the received image data in order to make color page printing continuous;

printing on papers in the changed order, wherein after printing one of the color pages and the monochromatic pages, the other of the color pages and the monochromatic pages is continuously printed by the same printer; and discharging printed papers into a plurality of bins based on page numbers received.

7. A method according to claim 6, further comprising a step of changing the bin to be used for receiving the printed papers if the page number is discontinuous during continuous printing of color pages.

8. A method according to claim 6, further comprising a step of changing the bin to be used for receiving the printed papers if the page number is discontinuous during continuous printing of monochromatic pages.

9. A method according to claim 6, further comprising a step of designating one of said bins, which is initially used for receiving the printed pages, as a next bin to be used for receiving the printed papers when continuous printing of a series of monochromatic pages or color pages is completed.

10. An apparatus comprising:

a receiving unit for receiving image data including color pages containing color images and monochromatic pages not containing any color images;

a sorting unit for sorting the image data into a color page group and a monochromatic page group;

a printing unit for printing continuously on papers by group sorted by the sorting unit, wherein after printing one of the color page group and the monochromatic page group, the other of the color page group and the monochromatic page group is continuously printed by the same printer; and a discharge unit for discharging printed papers into a plurality of bins based on page numbers received.

11. An apparatus according to claim 10, in which said discharge unit changes the bin to be used for receiving the printed papers, if the page numbers are discontinuous.

12. An apparatus according to claim 10, in which the order of changing said bins for receiving the printed pages of one group corresponds to the order of changing said bins for receiving the printed pages of the other group.

13. An apparatus according to claim 10, in which said page number is determined, based on the order of receiving the image data.

14. An apparatus according to claim 10, in which said printing unit starts to print a first page before the image data receiving is completed.

* * * * *